US 7,697,928 B2

(12) United States Patent
Shvodian et al.

(10) Patent No.: US 7,697,928 B2
(45) Date of Patent: Apr. 13, 2010

(54) SYSTEM AND METHOD FOR DEVICE TESTING

(75) Inventors: William M. Shvodian, McLean, VA (US); Eric H. Boll, Reston, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 877 days.

(21) Appl. No.: 11/513,365

(22) Filed: Aug. 31, 2006

(65) Prior Publication Data

US 2008/0057874 A1 Mar. 6, 2008

(51) Int. Cl.
*H04Q 7/20* (2006.01)
(52) U.S. Cl. ............... 455/423; 455/424; 455/67.11; 455/67.14; 455/226.1; 455/553.1; 370/241; 370/249
(58) Field of Classification Search .......... 455/423, 455/424, 67.11, 67.13, 67.14, 226.1, 553.1; 370/241, 249
See application file for complete search history.

(56) References Cited

U.S. PATENT DOCUMENTS

| | | | |
|---|---|---|---|
| 5,521,904 A * | 5/1996 | Eriksson et al. ........... 370/249 |
| 5,754,560 A * | 5/1998 | Nousiainen et al. ........ 714/716 |
| 6,253,060 B1 * | 6/2001 | Komara et al. .............. 455/9 |
| 6,680,913 B1 * | 1/2004 | Malmivirta et al. ........ 370/249 |
| 6,721,541 B1 * | 4/2004 | Kingsley ................ 455/67.11 |
| 6,748,212 B2 * | 6/2004 | Schmutz et al. ........... 455/424 |
| 7,162,206 B2 * | 1/2007 | Hayashi ................. 455/67.11 |
| 7,236,778 B2 * | 6/2007 | Schreiber ................. 455/423 |
| 7,561,851 B2 * | 7/2009 | Shen et al. ................. 455/73 |
| 2005/0221765 A1 * | 10/2005 | Shen et al. ................. 455/73 |
| 2006/0194553 A1 * | 8/2006 | Ozaki et al. ............. 455/226.1 |
| 2007/0072599 A1 * | 3/2007 | Romine et al. ............. 455/423 |

* cited by examiner

*Primary Examiner*—Marceau Milord

(57) ABSTRACT

An electronic device (120) is provided that comprises: a transceiver circuit (310) configured to send and receive signals; a memory unit (330) configured to contain testing, configuration, and calibration (TCC) code (440, 450, 460) used to define TCC functions in the device, and operational code (470) used to define operational functions in the device; and a device controller (320) connected to the transceiver circuit and the memory unit, configured to control the device in an operational mode in accordance with the operational code and operational instructions received via the transceiver circuit (650), and to control the device in a TCC mode in accordance with the TCC code and TCC instructions received via the transceiver circuit (635, 640). The device controller is further configured to permanently disable access to at least a portion of the TCC code in response to a disable instruction received via the transceiver circuit (645).

20 Claims, 4 Drawing Sheets

SYSTEM AND METHOD FOR DEVICE TESTING

FIELD OF THE INVENTION

The present invention relates in general to a system and method for performing testing, calibration, or configuration operations on an electronic device.

BACKGROUND OF THE INVENTION

In any manufacturing process, it is desirable to perform some tests on a device before it can be certified as being in acceptable condition for use. For example, in a communications device it is important to test whether it can successfully send data to and receive data from a remote device. It may also be desirable to configure the device during manufacturing to set any variable parameters to ones that are proper for operational use. In a communications device this could include setting channels that are used, codes that are used, power levels, etc.

When performing this testing, configuration, and calibration, it is generally desirable to have a communication link between testing equipment and the device to be tested. This link can be used to pass testing or configuration instructions from the testing equipment to the device to be tested, or to pass some kind of acknowledgement of those instructions from the device to be tested to the testing equipment.

Devices have typically been provided with a dedicated testing link that is used during the testing, calibration, and configuration process. The connections for this link can then be sealed off after testing is complete, severely limiting a users ability to access it after purchase. This provide a relatively secure link for testing, but also increases the complexity, size, and cost of the final device.

Communications devices have an existing communications link, but this has not been considered a viable testing link because its use could open up a huge security gap, allowing the device to be improperly reconfigured or otherwise compromised in the future. In other words, if a testing device could connect up to the device under testing during a testing, configuration, and calibration process and perform testing, configuration, and calibration operations, then another device might be able to do so at a later time, long after testing, configuration, and calibration was completed. This is of particular concern when the basic communications link is used (as opposed to a dedicated testing link) because that basic communications link will remain in use during the life of the device.

And if the testing, configuration, and calibration operations were improperly accessed, the device could be reconfigured in ways that might be improper or even illegal. For example, an unscrupulous user might use the communications link to change the codes used, to change the frequency used, to increase the transmission power beyond regulatory limits, etc.

It is therefore desirable to provide a means by which a communication device's basic communications link can be used for testing a device, but in a manner that will not open it up to later security vulnerabilities.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual relationship or order between such entities, items or actions. It is noted that some embodiments may include a plurality of processes or and can be referred to generally as a testing process or a TCC process. A testing process or TCC process may include some or all of testing, configuration, or calibration operations, but need not include all three types of operations. But for simplicity of disclosure it will be referred to as a testing process or TCC process.

The testing operations will test whether the device is working properly; the configuration operations will configure various device parameters (e.g., codes, channels, encryption keys, etc.); and the calibration operations will calibrate various operational values (e.g., transmission power) for proper device operation. For simplicity of disclosure, however, the performance of the TCC operations will be referred to as a testing process, even though configuration and calibration operations are also performed.

Figure 1:
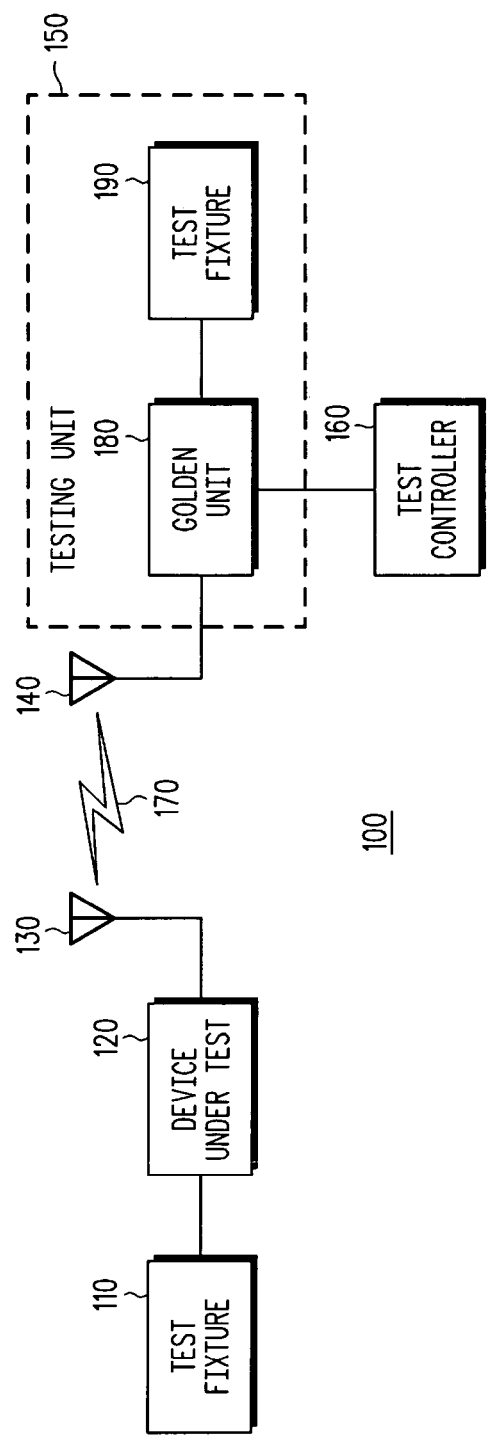
FIG. 1 is a block diagram of a wireless testing system according to disclosed embodiments of the present invention.

FIG. 1 is a block diagram of a wireless testing system according to disclosed embodiments of the present invention. As shown in FIG. 1, the wireless testing system 100 includes a test fixture 110, a device under test 120, an antenna 130, an antenna 140, a testing unit 150, and a test controller 160. The testing unit 150 further includes a golden unit 180 and a test fixture 190.

The test fixture 110 is an element that is designed to hold the device under test 120 during a testing process. This can be used to provide the device under test 120 with power, if necessary, place it in a known environment, or otherwise facilitate the testing process. It can be eliminated in any embodiment where no additional functionality is required during testing.

The device under test 120 is a wireless device whose functionality is to be tested. It has a capability to communicate wirelessly, and can perform both operational functions and testing/configuration functions.

The antenna 130 is connected to the device under test 120 and is configured to send data to and receive data from the testing unit 150 via a wireless channel 170. Likewise, the antenna 140 is connected to the testing device 150 and is configured to send data to and receive data from the device under test 120 via the wireless channel 170.

The testing unit 150 communicates with the device to be tested 120, and controls the testing process for the device under test 120. It provides instructions to the device under test 120 for it to execute TCC operations. And when the testing process is completed, it instructs the device under test 120 to disable all of the TCC operations solely associated with the testing process. As noted above, in some embodiments the testing unit can include a golden unit 180 and a test fixture 190.

The golden unit 180 is a device that is capable of communicating with the device under test 120. However, the golden unit 180 is known to be functioning within certain acceptable parameters. Since the golden unit 180 has known performance values, it can be used to test the operation of the device to be tested, whose performance values are unknown.

In some embodiments the golden unit 180 can be network device that is comparable to the device under test 120. In other embodiments it can be a network coordinator, of the sort that could be used to control the operation of the device under test 120.

The test fixture 190 is an element that is designed to hold the golden unit 180 during the testing process. This can be used to provide the golden unit 180 with power, if necessary, place it in a known environment, or otherwise facilitate the testing process. It can be eliminated in any embodiment where no additional functionality is required during testing.

The test controller 160 controls the operation of the testing unit 150, and therefore the testing of the device under test 120. It provides instructions to the testing unit with respect to what tests to perform and when testing is finished. In some embodiments the test controller 160 can be a part of the testing unit 150. In others it can be a separate entity. In yet other embodiments a test controller 160 can replace the testing unit 150, simulating the operation of a testing unit.

In the particular embodiment described with respect to FIG. 1, the test controller 160 controls the operation of the golden unit 180. In alternate embodiments that don't employ a golden unit 180, the test controller 160 will control operation of the appropriate portion of the testing unit 150.

Although the above system disables all of the TCC operations associated with the testing process after the testing process ends, this does not necessarily mean that all possible TCC operations will be disabled. In some embodiments there may be some TCC operations that are not solely associated with the testing process. For example, there may be some testing operations that are used periodically during normal operation to check system parameters; there may be some calibration operations that are maintained for periodic recalibration operations after testing; and there may be configuration operations that allow certain system parameters (e.g., codes, channels, etc.) to be altered.

Thus, when disabling TCC operations at the end of a TCC process, the testing unit 150 does not necessarily disable the testing capability, but may only disable the external control of that testing capability.

Wired Testing System

Figure 2:
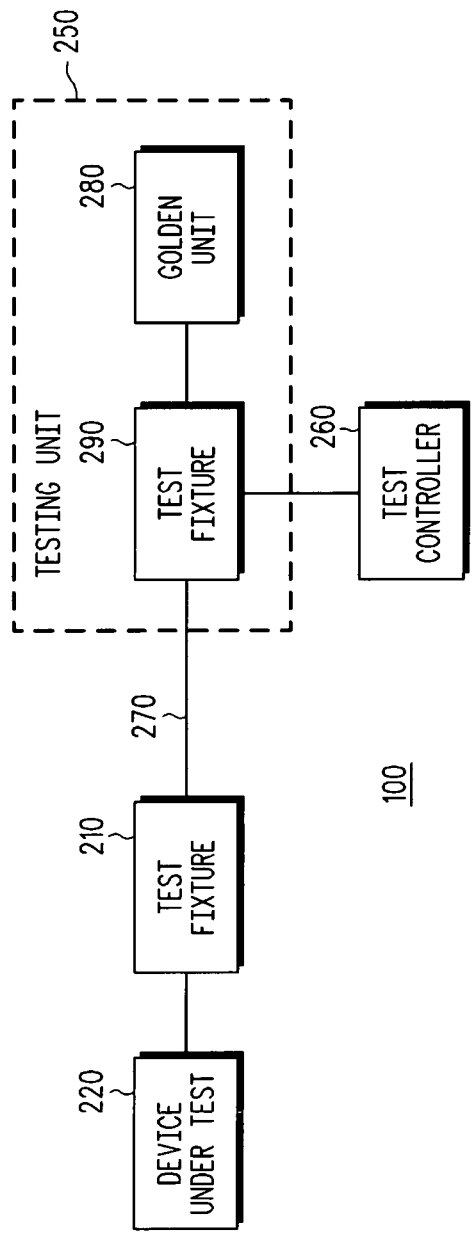
FIG. 2 is a block diagram of a wireless testing system according to disclosed embodiments of the present invention.

Although the embodiments described with respect to FIG. 1 relate to wireless communications devices, the conceived testing system should not be limited to wireless devices, and can be applied to wired devices as well. FIG. 2 is a block diagram of a wired testing system according to disclosed embodiments of the present invention. As shown in FIG. 2, the wired testing system 100 includes a test fixture 210, a device under test 220, a testing unit 250, a test controller 260, and a wired connection 270. The testing unit 250 further includes a golden unit 280 and a test fixture 290.

The test fixture 210, device under test 220, testing unit 250, and test controller 260 operate essentially as their corresponding units described above act in a wireless system, except that the device under test 220 and the golden unit 280 communicate with each other over a wired connection 270.

In the particular embodiments disclosed in FIG. 2, the wired connection 270 is routed through the test fixture 210 and the test fixture 290. By consolidating the number of connection steps required to prepare the device under test 220 and the golden unit 280, this design allows the device under test 220 and the golden unit 280 to be more easily attached into the testing circuit 250, eliminating complexity and saving time during the testing process.

In alternate embodiments, however, the device under test 220 or the golden unit 280 can be directly connected to the wired connection 270. In such a case, either or both of the test fixture 210 and the test fixture 290 can be eliminated if none of their other properties are required.

Device Under Test

Figure 3:
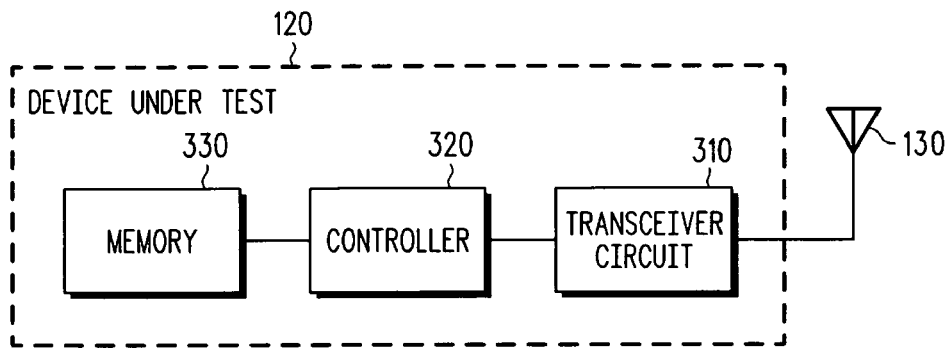
FIG. 3 is a block diagram of a device under test from FIG. 1, according to disclosed embodiments of the present invention.

FIG. 3 is a block diagram of the device under test from FIG. 1, according to disclosed embodiments of the present invention. As shown in FIG. 3, the device under test 120 is attached to an antenna 130 and includes a transceiver circuit 310, a controller 320, and a memory 330.

The transceiver circuit 310 is connected to the antenna 130 and serves to send signals to and receive signals from remote devices. In some embodiments, this is the portion of the device under test 120 that is to be tested, calibrated, and/or configured.

The controller 320 is a circuit that controls the operation of the transceiver circuit, and monitors the configuration and calibration of the transceiver circuit 320. This can be a microprocessor associated with the transceiver circuit 310, or a more specific processor designed to coordinate the functions of the transceiver circuit.

The memory 330 contains the instructions necessary for operation of the controller 320. In some embodiments it includes a non-volatile memory, such as a flash memory, EPROM, EEPROM, MRAM, or the like. However, in other embodiments it may also include a volatile memory such as a RAM or an SRAM.

Figure 4:
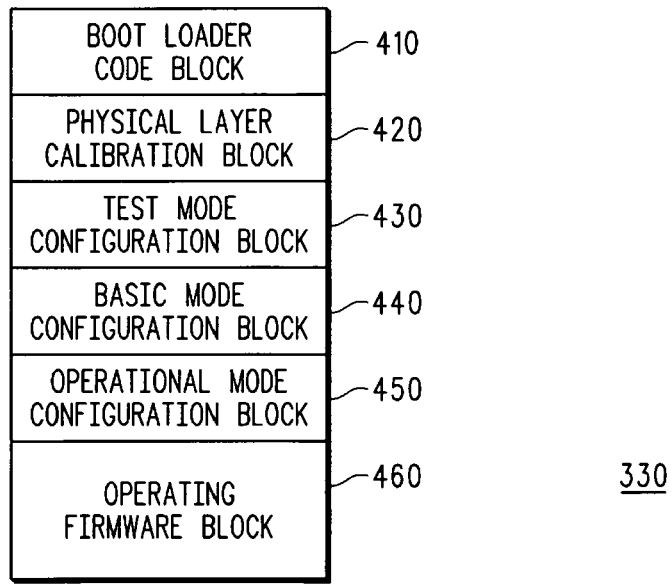
FIG. 4 is a code block diagram of a memory from FIG. 3, according to disclosed embodiments of the present invention.

FIG. 4 is a code block diagram of a memory from FIG. 3, according to disclosed embodiments of the present invention. As shown in FIG. 4, the memory 330 includes multiple memory blocks, including a boot loader code block 410, a physical layer (PHY) calibration block 420, a media access controller (MAC) a test mode configuration block 430, a basic mode configuration block 440, an operational mode configuration block 450, and an operating firmware block 460.

The boot loader code block 410 includes the instructions necessary to allow the controller 320 in the device under test 120 to initialize and start operations from when it powers up.

The PHY calibration block 420 includes the instructions necessary to allow the controller 320 to calibrate a PHY portion of the transceiver circuit 310. This can include calibrating transmit power levels, voltage biases, signal recovery algorithms, and the like.

The test mode configuration block 430 contains all the instructions and device configurations necessary to allow the controller 320 to control the transceiver circuit 310 to perform all testing and configuration functions appropriate for the testing process. This can include testing transmit data flow, running link performance tests, and configuring the operating parameters for the device (e.g., MAC address, security encryption keys, serial number, radio rates, forward error correction parameters, coarse gain, etc.).

The basic mode configuration block 440 contains all the instructions and device configurations necessary to allow the controller 320 to control the transceiver circuit 310 to perform all functions appropriate for a factory default mode. This would correspond to a basic mode that every device uses as a default, unless and until it is reconfigured into a different operational mode.

The operational mode configuration block 450 contains all the instructions and device configurations necessary to allow the controller 320 to control the transceiver circuit 310 to perform all functions appropriate for an operational mode. This operational mode could be preset in the memory 330 during manufacture, or could be modified by a user or tester as needed.

In alternate embodiments, the basic mode configuration block 440 could be eliminated, requiring that parameters of the operational mode configuration block be set prior to use. This would eliminate a factory default mode for the device, but would reduce the required size of the memory.

The operating firmware block 460 includes all of the firmware necessary to allow the controller 320 to control all of the functions that the transceiver circuit 310 of the device under test needs to perform during normal operation. These functions can include the behavior of a physical layer, the behavior of a medial access control layer, the operation of the protocol stack, etc.

In some embodiments, operations in the various memory blocks 410460 can be stored in a non-volatile portion of the memory 330, and then transferred to a non-volatile portion of the memory 330 for execution. In other embodiments operations in the various memory blocks 410-460 can be run directly from a non-volatile portion of the memory 330.

In addition to providing for normal operation of the transceiver circuit 310, the controller 320 also includes functionality that allows it to disable portions of the memory 330 that it would be undesirable for users to have access to. These could include the PHY calibration block 420, the test mode configuration block 430, or any other appropriate instruction blocks.

The disabling process could involve physically erasing certain memory blocks, invalidating the addresses to those blocks, setting a status bit to disable some functions such as inbound test mode commands, flipping a status bit to disable access to the memory blocks, blowing a physical fuse to remove access to memory blocks, or any other method of denying access to the relevant memory blocks.

In particular, an electronic device is provided, comprising: a transceiver circuit configured to send and receive signals across a transmission channel; a non-volatile memory unit configured to contain testing, configuration, and calibration (TCC) code used to define TCC functions in the electronic device, and operational code used to define operational functions in the electronic device; and a device controller connected to the transceiver circuit and the non-volatile memory unit, configured to control the electronic device in an operational mode in accordance with the operational code and operational instructions received via the transceiver circuit, and to control the electronic device in a TCC mode in accordance with the TCC code and TCC instructions received via the transceiver circuit. The device controller is further configured to permanently disable access to at least a portion of the TCC code in response to a disable instruction received via the transceiver circuit.

The non-volatile memory unit may be one of a flash memory, an erasable programmable read-only memory, an electrically erasable programmable read-only memory, a magnetic random access memory, and a magnetic disk.

The electronic device may be further configured to connect to a test fixture during a TCC operation, the test fixture including TCC circuitry used to gather TCC data.

The TCC mode may include at least one of: a power-up self test, a transmitter power calibration operation, a receiver power calibration operation, a link performance testing operation, a data flow testing operation, and an operating parameter configuration.

The transceiver circuit may be a wireless transceiver circuit, and the transmission channel is a wireless transmission channel.

The device controller may permanently disable at least a portion of the TCC code by either deleting the TCC code from the non-volatile memory, permanently removing an ability of the controller from accessing the TCC code in the non-volatile memory, or disabling one or more functions within the TCC code, or disabling processing of one or more possible TCC commands incoming to the device.

The electronic device may be implemented in an integrated circuit or multiple integrated circuits.

Method of Operating Device Under Test

Figure 5:
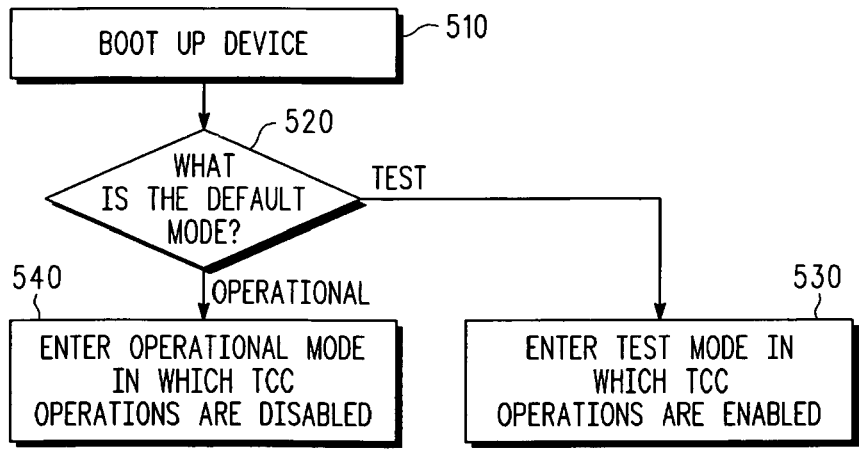
FIG. 5 is a flowchart showing the basic operation of a device under test, according to disclosed embodiments of the present invention.

FIG. 5 is a flow chart showing the basic operation of a device under test, according to disclosed embodiments of the present invention. As shown in FIG. 5, the basic operation begins when the device under test 120, 220 boots up. (510)

Once it's successfully booted up, the device under test 120, 220 determines what its default mode is currently set to. (520) In the embodiment of FIG. 5, this includes either a test mode or an operational mode. However, in alternate embodiments other modes could exist. For example, the device under test 120, 220 could have a basic mode that represents a factory default mode of operation.

If the default mode is determined to be the test mode, the device under test 120, 220 enters a test mode in which all TCC operations are enabled. (530) Once in the test mode, the device under test can undergo all necessary TCC operations to test that it's operating properly, to calibrate its operation as needed, and to configure all necessary operational parameters.

If the default mode is determined to be an operational mode, the device under test 120, 220 enters the operational mode in which some or all of the TCC operations have been disabled. The only TCC operations that should remain valid are those that may properly be used during operation. For example, if a device allows different channels to be chosen by the user from a list of available channels, a TCC operation that sets the channel may remain valid.

Figure 6:
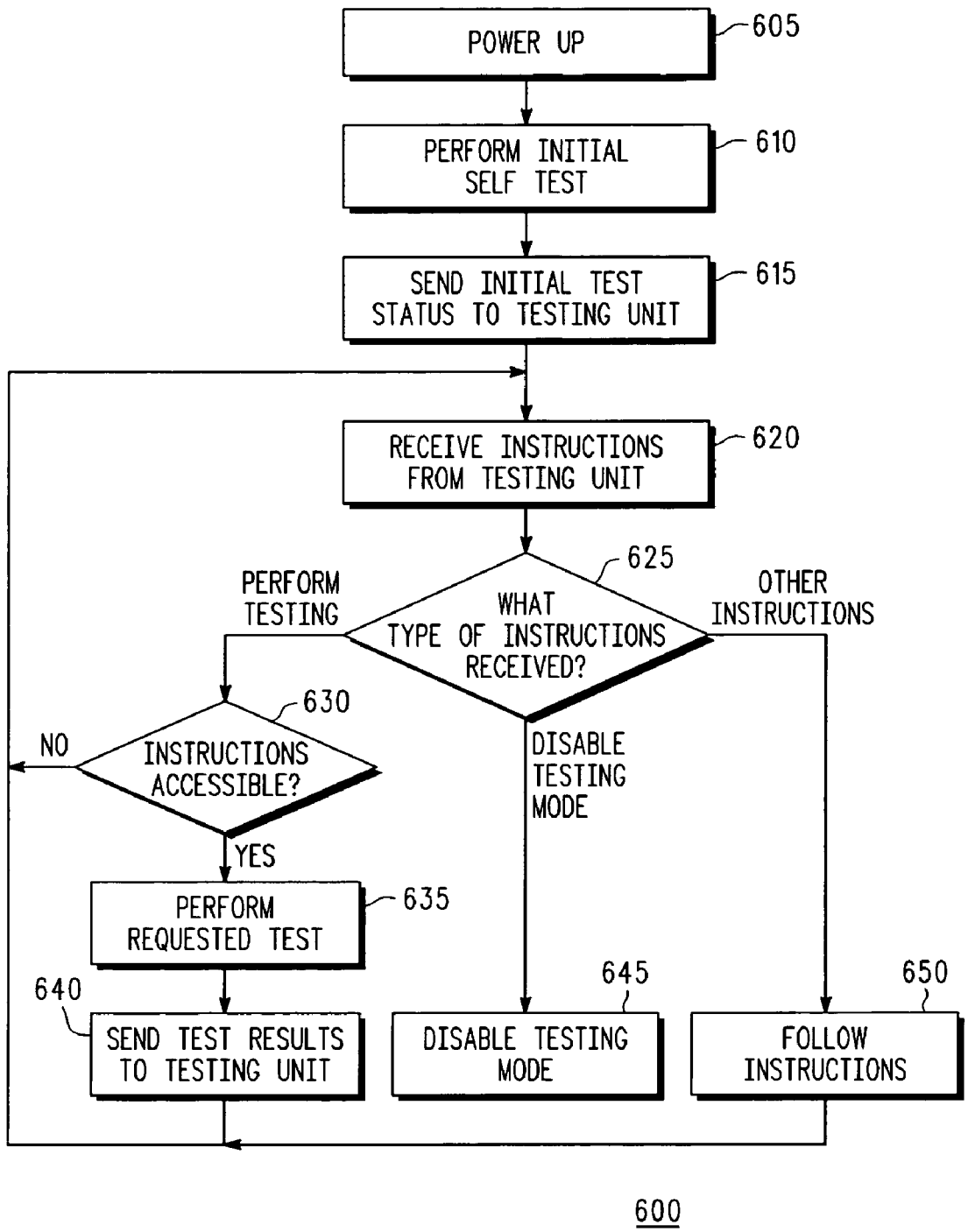
FIG. 6 is a flowchart showing the detailed operation of a device under test, starting in a test mode, according to disclosed embodiments of the present invention.

FIG. 6 is a flow chart showing the detailed operation of a device under test, starting in a test mode, according to disclosed embodiments of the present invention. This flow chart provides additional detail about how the device under test operates in one set of disclosed embodiments.

As shown in FIG. 6, the device under test 120, 220 begins by powering up (605) and then performing an initial self-test (610). This self test includes the basic requirements necessary to make contact with another device, including checking memory functions, checking input/output functions, initial PHY calibration, and the like. It generally does not include any tests designed to optimize performance.

Once it's finished performing its self test, the device under test 120, 220 then sends its initial test status to the testing unit. (615) By doing so, the device under test 120, 220 indicates that it's ready to receive instructions from the testing unit to perform one or more TCC operations.

At some time after it reports its initial self test status to the testing unit 150, 250, the device under test 120, 220 will receive instructions from the testing unit 150, 250 (620), and will determine what type of instructions have been received (625). These may be instructions for additional testing, instructions to disable the TCC operations, or some other kind of instruction.

Typically, the way the device under test 120, 220 determines what kind of instructions have been received is by identifying what memory block in the memory 330 the instructions direct the device under test 120, 220 to access. This allows the controller 320 to access and run the necessary instructions. In some embodiments the operation of determining the type of instructions received will be explicit (i.e., the controller 320 will actually determine whether testing instructions are received) and in others it will be implicit (i.e., the controller 320 will simply access the identified data block).

If the instructions are to perform additional testing (i.e., TCC operations), the device under test 120, 220 will first determine if the instructions for the requested TCC operations are accessible. (630) This could be simply performed by looking in memory to see if the relevant instructions are available, or could involve checking a flag of some sort to see if memory operations are allowed.

If the device under test 120, 220 has completed testing and some or all of its TCC functions are disabled, the device under test 120, 220 will no longer be able to access them. Therefore, if the device under test 120, 220 determines that the requested operations are no longer accessible, it will ignore the request and will await new instructions. (620) In alternate embodiments the device under test 120, 220 could also perform some kind of error processing.

If the device under test 120, 220 has not completed testing, however, its full TCC functions will remain enabled. Therefore, if the device under test 120, 220 determines that the requested operations are accessible, it will perform the requested test (635) and send the test results back to the testing unit (640). These test results could be specific data relating to the test, or the results could be a simple yes or no, indicating whether the device under test 120, 220 performed adequately. After finishing reporting, the device under test 120, 220 will then await new instructions. (620)

If the device under test 120, 220 determines that its received instructions are to disable the testing mode (625), the device under test 120, 220 will perform the steps necessary to disable the test mode. (645) This could include deleting one or more blocks from the memory 330, setting a status flag, blowing a fuse, or any other acceptable way of disabling access to TCC operations.

If the device under test 120, 220 determines that its received instructions are something other than instructions to perform testing or to disable the testing mode, it will proceed to follow those instructions (650) and will then proceed to await new instructions. (620) This could include instructions received during normal operation of the device.

In some embodiments in which the testing process is wireless, the disabling process could apply only to the wireless testing process. In such a case, a test mode could be re-enabled, but only by wired connection. This would address the security issue by requiring physical access to a device to re-renter the test mode.

In general, a method of operating an electronic device during testing, configuration, or calibration (TCC) is provided, comprising: receiving commands from a remote device; determining whether the received commands include TCC instructions that instruct the electronic device to perform one or more TCC operations; performing the one or more TCC operations to gather TCC data in accordance with the TCC instructions and stored TCC code if the received commands include TCC instructions; sending the gathered TCC data to the remote device if the received commands include TCC instructions; determining whether the received commands include disabling instructions that instruct the electronic device to disable at least part of the TCC mode; and permanently disabling at least part of the TCC mode if the received commands include disabling instructions.

The method may further comprise: powering up the electronic device; performing an initial self-test on the electronic device to determine device status information indicating an operational status of the electronic device; and sending the device status information to the remote device before receiving instructions from the remote device.

The initial self-test may include one or more of: testing memory functions, testing input/output functions, and testing and calibration of a physical layer.

The one or more TCC operations may include at least one of: a transmitter power calibration operation, a receiver power calibration operation, a link performance testing operation, a data flow testing operation, and an operating parameter configuration.

The operations of receiving commands from a remote device, determining whether the received commands include TCC instructions, performing the one or more TCC operations, and sending the gathered TCC data to the remote device may be repeated a plurality of times before the operation of permanently disabling at least part of the TCC mode.

The receiving of commands and the sending of TCC data may be performed using a wireless transmission channel.

The operation of permanently disabling the at least part of the TCC mode may be performed by one of: deleting a set of TCC code from a memory in the electronic device, permanently removing an ability of a controller in the electronic device from accessing the set of TCC code, or disabling the processing of one or more TCC commands.

The method may be implemented in an integrated circuit.

Method of Operating Testing Device

Figure 7:
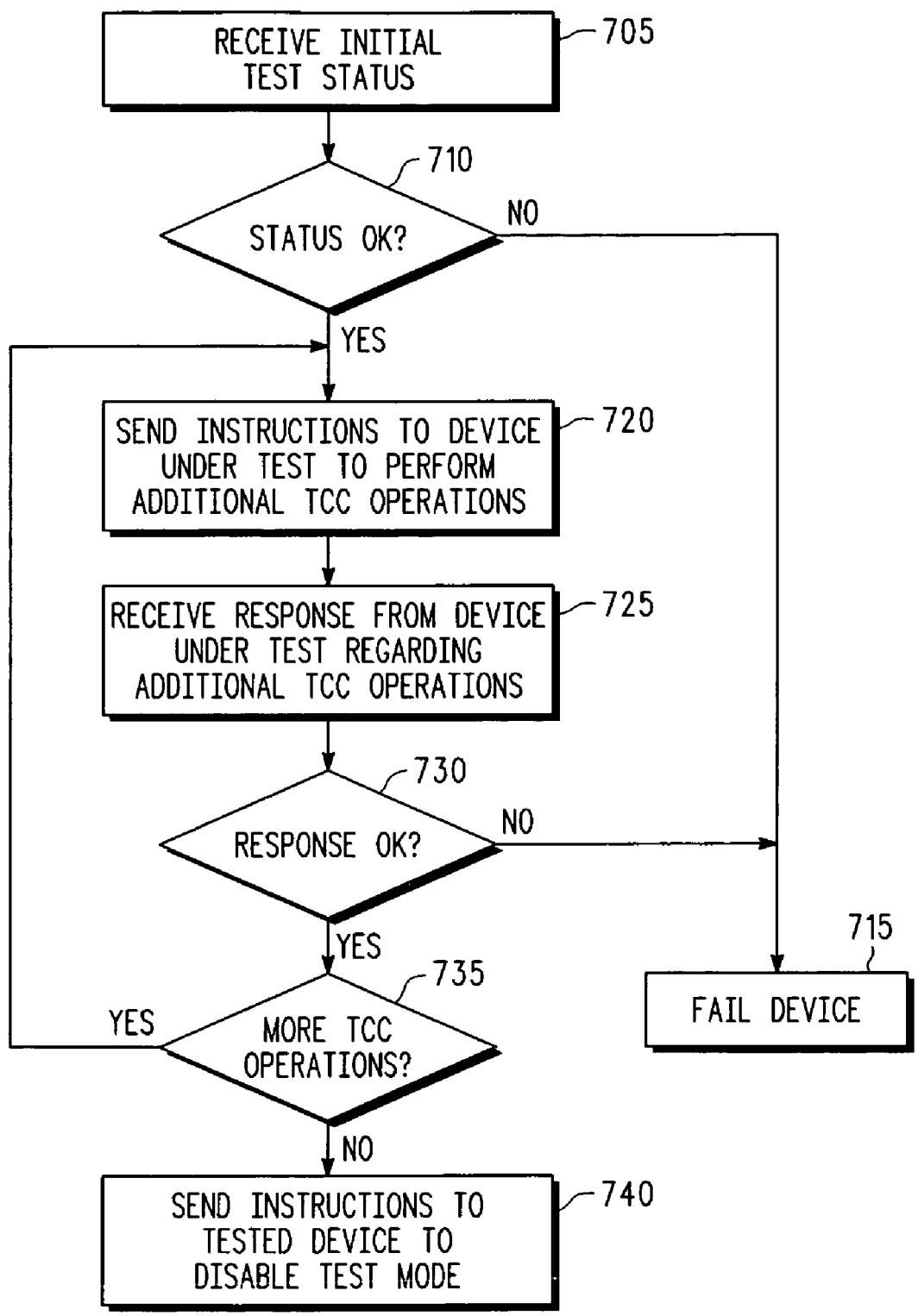
FIG. 7 is a flowchart showing the detailed operation of a testing device, according to disclosed embodiments of the present invention.

FIG. 7 is a flow chart showing the detailed operation of a testing device, according to disclosed embodiments of the present invention.

As shown in FIG. 7, the testing device 150, 250 begins when it receives the initial test status from a device under test 120, 220. (705) This initial test status lets the testing device 150, 250 know that the device under test 120, 220 has powered up and has successfully performed its initial self test.

Based on this response, the testing device 150, 250 determines whether initial test status indicates that the device under test 120, 220 is of sufficient quality to progress with additional testing. (710) In some embodiments the testing device 150, 250 can also have a set time it will wait for a new device to finish its self test after which it will automatically determine that the device has failed. In others, the test for whether the initial test status indicates sufficient quality (710) can be performed solely by a time-out process, the fact that the device under test 120, 220 succeeded in the self test sufficiently to send the initial test status being an indicator that further testing is warranted.

If the testing device 150, 250 determines that the status is not sufficient to warrant further testing, the testing device 150, 250 will indicate that the device under test 120, 220 has failed. (715) In this case the device under test 120, 220 will be tagged as a failed device and will be disposed of accordingly.

If the testing device 150, 250 determines that the status is sufficient to warrant further testing, however, the testing device 150, 250 will then send instructions to the device under test 120, 220 to perform an additional TCC operations. (720) This can be any sort of test, calibration, or configuration for which the device under test 120, 220 has a TCC operation in memory (e.g., a link performance test, a data flow test, a configuration of MAC address, a configuration of security keys, etc.).

The testing device 150, 250 then waits until it receives a response from the device under test 120, 220 indicating the result of the additional TCC operation. (725) This can be as elaborate as a stream of test data indicating some measured parameter pertaining to the TCC operation, or a simple as a status bit indicating success or failure. It could even be the passing of a particular testing time with no response.

Once it receives the response (725) the testing device 150, 250 determines whether the parameters of the response are acceptable or not. (730)

If they are not acceptable, the testing device 150, 250 will indicate that the device under test 120, 220 has failed (715), and the failed device and will be disposed of accordingly.

If, however, the results are acceptable, the testing device 150, 250 will then determine if it has more TCC operations to request. (735)

If there are more TCC operations to be performed, the testing device 150, 250 will once more send instructions to the device under test 120, 220 to perform an additional TCC operation (720) and proceed as noted above.

If there are no more TCC operations to be performed, the testing device 150, 250 will send final instructions to the device under test 120, 220 to disable the test mode. (740) After this, the device will be considered to be properly tested, configured, and calibrated, and will be considered marketable.

In some alternate embodiments, however, some additional operations can be performed once the final TCC operation has been completed. In particular, the testing device 150, 250 could have a series of final operations that take place only after all regular TCC operations are completed. For example, as a final set of operations before disabling the testing mode, the testing device 150, 250 could change the security keys it used, test communications with the new keys, wipe the old security key from memory, and only then disable the test mode. This would allow for added security by using two different security keys for testing and regular operation. Thus, even if a user somehow obtained access to a TCC operation, that user would have to break a new security key to use those functions. These final processes would have to be performed before the test mode was disabled because typically changing the security keys is the sort of thing that would be a disabled TCC operation.

In general, a method of operating an electronic device to control testing, configuration, or calibration (TCC) is provided, comprising: sending TCC commands to a remote device, the TCC commands including TCC instructions instructing the remote device to perform one or more TCC operations; receiving TCC data from the remote device after sending the TCC commands; sending disabling commands to the remote device, the disabling commands instructing the remote device to permanently disable at least some of the TCC functions, after receiving the TCC data.

The method may further comprise indicating that the remote device has failed a TCC process if the TCC data indicates that the remote device failed at least one of the one or more TCC operations.

The method may further comprise receiving device status information from the remote device prior to sending TCC commands, the device status information indicating an operational status of the electronic device The method may further comprise repeating the operations of sending TCC commands and receiving TCC data a plurality of times prior to sending the disabling commands.

The disabling commands may include one of: instructions to delete a set of TCC code from a memory in the electronic device, instructions to permanently remove an ability of a controller in the electronic device from accessing the set of TCC code, and instructions to disable the processing of one or more TCC commands.

Conclusion

By allowing the disabling of some or all TCC operations in a communications device, the disclosed systems and methods may allow for a testing mode that uses an existing data connection for testing, while hiding that testing mode during normal operation. Not only will a user of the device not be able to access the disabled TCC operations, but the user should not even be made aware that they existed in some embodiments. Since the TCC operations were disabled before the user ever obtained the device in some embodiments, no trace should remain of their existence. There should be no prompts for device drivers, no mode menus that list a testing mode, etc. Thus, a user will not be able to use the existing data connection to improperly reconfigure the communications device in some embodiments.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. An electronic device, comprising:
    a transceiver circuit configured to send and receive signals across a transmission channel;
    a non-volatile memory unit configured to contain at least one of testing, configuration, or calibration (TCC) code used to define at least one TCC function in the electronic device, and operational code used to define operational functions in the electronic device; and
    a device controller connected to the transceiver circuit and the non-volatile memory unit, configured to control the electronic device in an operational mode in accordance with the operational code and operational instructions received via the transceiver circuit, and to control the electronic device in a TCC mode in accordance with the TCC code and TCC instructions received via the transceiver circuit, wherein the device controller is further configured to permanently disable access to at least a portion of the TCC code in response to a disable instruction received via the transceiver circuit.

2. The electronic device of claim 1, wherein the non-volatile memory unit is one of a flash memory, an erasable programmable read-only memory, an electrically erasable programmable read-only memory, a magnetic random access memory, and a magnetic disk.

3. The electronic device of claim 1, wherein the transceiver circuit is further configured to connect to a test fixture during a TCC operation, the test fixture including TCC circuitry used to gather TCC data.

4. The electronic device of claim 1, wherein the TCC mode includes at least one of: a power-up self test, a transmitter power calibration operation, a receiver power calibration operation, a link performance testing operation, a data flow testing operation, and an operating parameter configuration.

5. The electronic device of claim 1, wherein the transceiver circuit is a wireless transceiver circuit, and the transmission channel is a wireless transmission channel.

6. The electronic device of claim 1, wherein the device controller permanently disables at least a portion of the TCC code by at least one of: deleting the TCC code from the non-volatile memory, permanently removing an ability of the controller from accessing the TCC code in the non-volatile memory, and disabling one or more functions within the TCC code, or disabling processing of one or more possible TCC commands incoming to the device.

7. The electronic device of claim 1, wherein the electronic device is implemented in an integrated circuit.

8. A method of operating an electronic device during testing, configuration, or calibration (TCC), comprising:
receiving commands from a remote device;
determining whether the received commands include TCC instructions that instruct the electronic device to perform one or more TCC operations;
performing the one or more TCC operations to gather TCC data in accordance with the TCC instructions and stored TCC code if the received commands include TCC instructions;
sending the gathered TCC data to the remote device if the received commands include TCC instructions;
determining whether the received commands include disabling instructions that instruct the electronic device to disable at least part of the TCC mode; and
permanently disabling at least part of the TCC mode if the received commands include disabling instructions.

9. The method of claim 8, further comprising:
powering up the electronic device;
performing an initial self-test on the electronic device to determine device status information indicating an operational status of the electronic device; and
sending the device status information to the remote device before receiving instructions from the remote device.

10. The method of claim 9, wherein the initial self-test includes one or more of: testing memory functions, testing input/output functions, and testing and calibration of a physical layer.

11. The method of claim 8, wherein the one or more TCC operations includes at least one of: a transmitter power calibration operation, a receiver power calibration operation, a link performance testing operation, a data flow testing operation, and an operating parameter configuration.

12. The method of claim 8, wherein the operations of receiving commands from a remote device, determining whether the received commands include TCC instructions, performing the one or more TCC operations, and sending the gathered TCC data to the remote device are repeated a plurality of times before the operation of permanently disabling at least part of the TCC mode.

13. The method of claim 8, wherein the receiving of commands and the sending of TCC data are performed using a wireless transmission channel.

14. The method of claim 8, wherein the operation of permanently disabling the at least part of the TCC mode is performed by at least one of: deleting a set of TCC code from a memory in the electronic device, permanently removing an ability of a controller in the electronic device from accessing the set of TCC code, or disabling the processing of one or more TCC commands.

15. The method of claim 8, wherein the method is implemented in an integrated circuit.

16. A method of operating an electronic device to control testing, configuration, or calibration (TCC), comprising:
sending TCC commands to a remote device, the TCC commands including TCC instructions instructing the remote device to perform one or more TCC operations;
receiving TCC data from the remote device after sending the TCC commands;
sending disabling commands to the remote device, the disabling commands instructing the remote device to permanently disable at least some of the TCC functions, after receiving the TCC data.

17. The method of claim 16, further comprising indicating that the remote device has failed a TCC process if the TCC data indicates that the remote device failed at least one of the one or more TCC operations.

18. The method of claim 16, further comprising receiving device status information from the remote device prior to sending TCC commands, the device status information indicating an operational status of the electronic device.

19. The method of claim 16, further comprising repeating the operations of sending TCC commands and receiving TCC data a plurality of times prior to sending the disabling commands.

20. The method of claim 16, wherein the disabling commands include one of: instructions to delete a set of TCC code from a memory in the electronic device, instructions to permanently remove an ability of a controller in the electronic device from accessing the set of TCC code, and instructions to disable the processing of one or more TCC commands.

* * * * *